United States Patent [19]
Peaslee et al.

[11] Patent Number: 5,410,647
[45] Date of Patent: Apr. 25, 1995

[54] HARDWARE SYMBOLOGY AND TEXT GENERATOR IN A GRAPHICS RENDERING PROCESSOR

[75] Inventors: John M. Peaslee; Jeffrey C. Malacarne, both of Chino Hills, Calif.

[73] Assignee: Hughes Aircraft Company, Los Angeles, Calif.

[21] Appl. No.: 172,672

[22] Filed: Dec. 22, 1993

Related U.S. Application Data

[63] Continuation of Ser. No. 582,696, Sep. 14, 1990, abandoned.

[51] Int. Cl.6 ............................................. G06F 15/62
[52] U.S. Cl. ..................................... 395/150; 395/101
[58] Field of Search ............. 395/150, 151, 110, 109, 395/100, 101; 345/143, 144

[56] References Cited

U.S. PATENT DOCUMENTS

| | | | |
|---|---|---|---|
| 4,139,838 | 2/1979 | Inose et al. | 395/150 |
| 4,156,915 | 5/1979 | Hasenbalg et al. | 395/150 |
| 4,330,834 | 5/1982 | Murphy | 395/150 |
| 4,400,697 | 8/1983 | Currie et al. | 340/711 |
| 4,594,674 | 6/1986 | Boulia et al. | 395/150 |
| 4,635,212 | 1/1987 | Hatazawa | 395/110 |
| 4,660,999 | 4/1987 | Tsuneki | 395/110 |
| 4,763,118 | 8/1988 | Takai | 340/735 |
| 4,858,148 | 8/1989 | Ueda | 395/110 |
| 4,876,562 | 10/1989 | Suzuki et al. | 346/160 |
| 4,881,180 | 11/1989 | Nishiyama | 395/110 |
| 4,887,226 | 12/1989 | Oba | 395/110 |
| 4,901,249 | 2/1990 | Shiota | 395/110 |
| 4,907,282 | 3/1990 | Daly et al. | 382/9 |
| 4,931,960 | 6/1990 | Morikawa | 395/110 |
| 4,980,840 | 12/1990 | Yin et al. | 395/150 |
| 5,108,206 | 4/1992 | Yoshida | 395/110 |
| 5,150,460 | 9/1992 | Onodera et al. | 395/151 |
| 5,201,032 | 4/1993 | Kurose | 395/150 |

*Primary Examiner*—Heather R. Herndon
*Assistant Examiner*—N. Kenneth Burraston
*Attorney, Agent, or Firm*—W. K. Denson-Low

[57] ABSTRACT

A symbology and text generator for use in a graphics rendering processor. The generator accesses font data stored in a processor display memory and generates symbols and text in dot matrix and stroke coded format. A typewriter controller is included which controls symbol and text spacing and live feed functions. The typewriter controller provides for symbol, text, and line of text rotation. Symbol scaling is also provided. A color multiplexer provides for symbols and background field colors. The colors are reversible.

15 Claims, 6 Drawing Sheets

HARDWARE SYMBOLOGY AND TEXT GENERATOR IN A GRAPHICS RENDERING PROCESSOR

This is a continuation of application Ser. No. 07/582,693, filed Sep. 14, 1990, now abandoned.

CROSS REFERENCE TO RELATED APPLICATIONS

The present application is related to contemporaneously filed patent applications: Ser. No. 07/582,696, filed on Sep. 14, 1990, entitled Dual Programmable Block Texturing and Complex Clipping in a Graphics Rendering Processor, now U.S. Pat. No. 5,255,760, Ser. No. 07/582,704 filed on Sep. 14, 1990, entitled "Dual Hardware Channels and Context Switching in a Graphics Processor,", abandoned in favor of U.S. application Ser. No. 08/083,855 which was abandoned in favor of U.S. application Ser. No. 08/206,239, Ser. No. 07/582,710 filed on Sep. 14, 1990, entitled "Concurrent General Purpose and DMA Processing in a Graphics Rendering Processor,", abandoned in favor of U.S. application Ser. No. 08/125,614 which is now U.S. Pat. No. 5,329,615, Ser. No. 07/582,728 filed on Sep. 14, 1990, entitled "Integrated Area Fill, Conics and Vector Generator in a Graphics Processor", now U.S. Pat. No. 5,303,321, Ser. No 07/582,694 filed on Sep. 14, 1990, entitled "Hardware Bit Block Transfer Processor,", now U.S. Pat. No. 5,218,674, Ser. No. 07/582,697 filed on Sep. 14, 1990, entitled "Multifunction High Performance Graphics Rendering Processor,", now U.S. Pat. No. 5,276,798, and Ser. No. 07/582,695 filed on Sep. 14, 1990, entitled "Hardware Multiprocess Scheduler in a Graphics Processor,", now U.S. Pat. No. 5,265,203, all by John M. Peaslee and Jeffrey C. Malacarne, whose teachings are incorporated herein by reference.

BACKGROUND

The present invention relates generally to digital graphic display processors, and more particularly, to a symbol and text graphics signal generator which provides multiple hardware based symbol and text generating capability.

Real time digital electronic displays are used in many applications such as military command and control workstations and air-traffic control systems. In these displays, the displayed information typically comprises real-time processed data generated by a host processor adapted to receive real-time information from one or more radars, communications systems and/or other data processors. These data are combined with one or more graphic primitives, such as a circle, ellipse or polygon, along with generated alphanumerics, mask areas and texture patterns to provide a relatively easily understood comprehensive graphic display on a graphics output device such as cathode-ray tube. In contemporary systems, the various components of the graphics display such as the graphic primitives, mask windows, fill texturing and the like are provided either by a general purpose computer based graphics generator or by a hardware specific graphics generator. Of these, general purpose graphics generators offer system versatility but usually must sacrifice some degree of system performance for ease of programming. On the other hand, hardware specific graphics generators, called cogenerators, provide good system performance.

Increasing demands on military command and control systems, military and civil air-traffic control systems arid the like have created a need for a high performance multifunction graphics rendering processor which provides a versatile hardware based symbol and text generating processor. It is therefore an objective of the invention to provide a multifunction graphics rendering processor that is a high performance two dimensional graphics engine which includes a hardware based modular solution to a wide variety of symbol and text graphic system applications. The multifunction graphics rendering processor is implemented as an integrated circuit chip using large scale integration logic. Another objective of the invention is to provide a symbol and text generating processor that generates both stroke coded and dot matrix symbols and text in a wide variety of fonts. Still another objective is to provide a symbol and text generating processor that is easily programmed and which provides a user friendly typewriter operating mode, automatic: underlining and which can render symbol and text in multiple directions.

SUMMARY OF THE INVENTION

The symbol and text generating processor of the invention forms a part of a graphics rendering processor. The graphics rendering processor includes input registers for receiving dam and program instructions from one or more host processors and a large display memory for storing: the data and program instructions. Also included in the graphics rendering processor is an attribute register for storing processor attributes that define the graphics rendering processor operating attributes. A display memory control means is provided for controlling the input and output of data to and from the display memory to and from other portions of the graphics rendering processor. In it's broader aspects, the symbol and tenet gene, rating processor includes a symbol input data register for storing symbol data and symbol generating commands input from the host processor and the attribute register. Also included is a font selection controller which is connected to the attribute register and symbol input registers for accessing symbol and text data stored in the display memory and corresponding to selected fonts, symbol types, and the like. The font selection controller also includes a display memory address generator for addressing the selected symbol and text data. A symbol generator is connected to the attributes register, input register, and display memory, and it generates symbol data signals and response thereto. A symbol controller is also connected to the input register and symbol generator for controlling the accessing of symbol and text data, input data, and operation of the symbol generator. The symbol controller may also synchronize operation of the symbol and text generating processor with other portions of the graphics rendering processor. A symbol output data register is connected to receive the generated symbol and text signals and apply the same to a bit mapped memory of a graphic display device such as a cathode ray tube.

Also included in the symbol and text generating processor is a typewriter controller connected to the font selection controller and the symbol generator. The typewriter controller controls symbol and text generating functions which include direction, symbol spacing, symbol rotation, automatic underlining of symbols, carriage returns, line feed functions, and similar typewriter like functions. The symbol and text generating processor may further include a color multiplexer for controlling the color of the generated symbols and text, the color of background areas enclosing generated symbols and text, and means for reversing symbol/text and background colors.

BRIEF DESCRIPTION OF THE DRAWINGS

The various features and advantages of the present invention may be more readily understood with reference to the following detailed description taken in conjunction with the accompanying drawings, wherein like reference numerals designate like structural elements, and in which.

DETAILED DESCRIPTION

Figure 1:
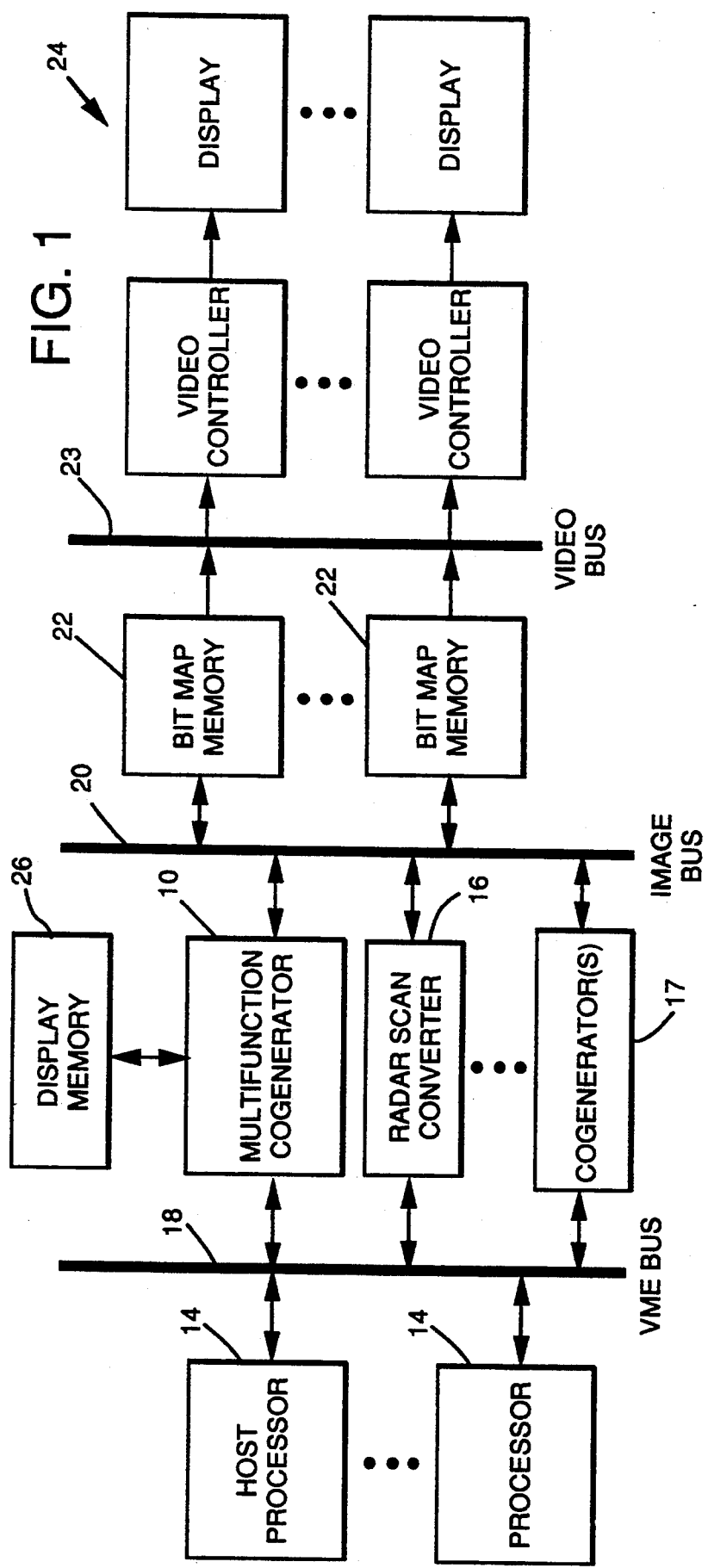
FIG. 1 is a basic block diagram of a graphics rendering system that incorporates a symbol and text generating processor of the present invention.
Figure 2:
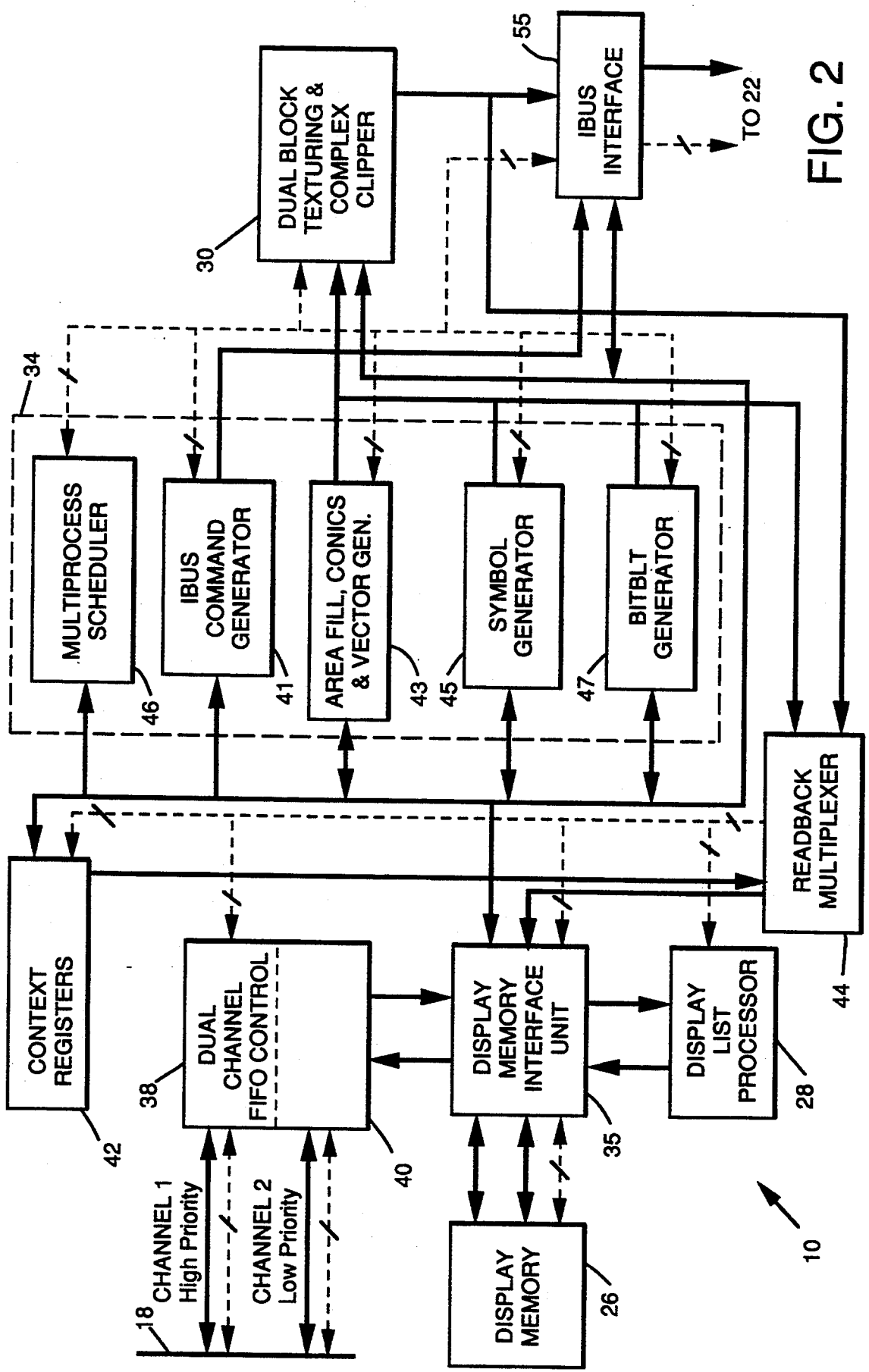
FIG. 2 is a detailed bock diagram of the graphics rendering processor of which the present invention forms a part.

Referring to the drawings, FIG. 1 is a block diagram of a generalized graphic display system including a dual channel multifunction cogenerator 10 of which the present invention forms a part. FIG. 2 shows a block diagram of the cogenerator 10 of which a dual channel FIFO controller 38, 40 and context registers 42 of the present invention forms a functionally distinct part. The cogenerator 10 is a dual channel, hardware based device which operates in conjunction with one or more general purpose data processing systems, such as a military command and control system, wherein the simplified system is shown in FIG. 1. Briefly, the system comprises one or more real time data processors 14 and other real time data accumulating devices such as a radar system 16 and other cogenerators 17. The host processor 14 and the radar scan converter 16, for example, feed data into the cogenerator 10 via a multifunction bus 18 where it is combined with graphics data generated by the cogenerator 10. The cogenerator 10 outputs a complete set of data for generation of a graphics display via a 64-bit bidirectional interconnect image bus 20 into a bit map memory 22 and then by way of a video bus 23 to a display system 24. The cogenerator 10 may include various other input devices such as manual input output devices, multiple real time processors, bulk memory devices and the like.

A detailed description of the cogenerator 10 is given in copending commonly assigned U.S. patent application Ser. No. 07/582,697, entitled, "Multifunction High Performance Graphics Rendering Processor", now U.S. Pat. No. 5,276,798, the teachings of which are incorporated herein by reference. In overview, however, the cogenerator 10 is a high performance single chip graphics rendering processor. It generates multiple graphics primitives and performs general purpose processing functions. The cogenerator accepts graphic commands over a thirty-two bit bidirectional host input port from a processor such as the host processor 14 of FIG. 1. The cogenerator 10 processes these commands and then draws into the bit mapped memory 22. The cogenerator 10 "draws" into the bit mapped memory 22 over the image bus 20. "Drawing" is performed by entering binary one and zero signals (drawing ones and drawing zeros herein) into individual memory locations of the bit mapped memory 22. Typically, the bit mapped memory 22 has multiple memory layers with the layers corresponding to color and intensity of graphic display pixels. The image bus 20 is a 64 bit bidirectional multi-user bus. The cogenerator 10 can draw graphic primitives such as symbols, polylines, rectangles, circles, ellipses, arcs, polygon fills, and perform bit block transfers (BITBLT) between the cogenerator 10, the host processor 14, and the bit mapped memory 22.

Directly associated with the cogenerator 10 is a triported display memory 26. The display memory 26 stores all commands and parameters and includes appropriate logic required for the cogenerator 10 to function properly. The memory address space in a working embodiment is 4 megabytes by 32 bits which may be arranged as shown in FIG. 2. The cogenerator 10 interfaces with either DRAMS, SRAMS, and/or PROMS. The display memory 26 is accessible by the cogenerator 10 display list processor 28, the cogenerator 10 internal graphics generator 34, and the host processor 14. Stored in the display memory 26 are two first in, first out (FIFO) memory buffers, one of the buffers being assigned a higher operational priority than the other and there being one buffer memory for each of two drawing channels. An address stack is provided for each FIFO buffer to store subroutines calls. An attribute stack stores all internal cogenerator attributes for hardware context switching, a sin/cosine table for drawing graphics, and up to 128 font tables to draw stroked and/or dot matrix symbols and characters. A large display list region is also provided.

The display memory 26 is comprised of up to four million words of RAM organized as 32 bit data words and appropriate buffer logic. The contents of the display memory 26 may be organized as shown in Table I below. The host processor 14 has the ability to perform random reads and writes at any address within the display memory 26 address space. The cogenerator 10 monitors the input of data from the host processor 14 to the display memory 26 to synchronize updating of data from the host processor 14 with the output of graphics signals therefrom.

TABLE 1

| MEMORY ADDRESS | | DATA TYPE |
|---|---|---|
| 4M | } | DISPLAY LIST |
| 520K | } | FONT TABLE |
| 8K | } | SINE/COSINE TABLE |
| 7K | } | ATTRIBUTE STACK |
| 6K | } | FIFO 2 |
| 2K | } | FIFO 1 |
| 1K | | |

TABLE 1-continued

| MEMORY ADDRESS | | DATA TYPE |
|---|---|---|
| 512 | } | SUBROUTINE STACK 2 |
| 256 | } | SUBROUTINE STACK 1 |
| 8 | } | INTERRUPT TABLE |
| 0 | } | UNUSED |

A dual channel FIFO buffer controller 38, 40 interfaces the cogenerator 10 to the host processor 14. The FIFO buffer controller 38, 40 are responsible for performing all interfacing duties such as proper "hand shaking" when the bus 18 is performing data transfers. The host processor 14 is able to both read and write to the cogenerator 10 and the display memory 26. When the host processor 14 reads or writes to the display memory 26, the FIFO buffer controller 38, 40 actually perform the read or write operations to the display memory 26 for the host processor 14. An address stack is provided internally within each FIFO buffer controller 38, 40 to store subroutine calls, an attributes stock to store all internal attributes required by the cogenerator 10 to perform hardware context switching, a sine/cosine table of drawing conics and primitives, up to 128 font tables to draw both stroked and dot matrix symbols and characters and a large display list region. The FIFO buffer controller 38, 40 is also responsible for arbitrating high and low priority channels to the cogenerator 10.

A display memory interface unit 35 performs the actual display memory 26 memory cycles. It is essentially a tri-port memory controller. The display memory 26 is used by both the host processor 14, and the cogenerator 10.

A display list processor 28 performs all of the cogenerator 10 command and display list processing. Commands are sent to the cogenerator 10 from the host processor 14. The display list processor 28 handles the various ways that commands can be sent to the cogenerator 10. The display list processor 28 interfaces to the display memory 26 using the display memory interface unit 35, reads commands from the FIFO buffers as well as performs other functions. When a command is given to the display list processor 28, the display list processor 28 processes the command and determines what action to take. The cogenerator 10 provides many different commands and sequences. A more detailed description of the display list processor is given in copending commonly assigned United States patent application Ser. No. 07/582,710 entitled "Concurrent General Purpose and DMA Processing in a Graphics Rendering Processor," abandoned in favor of U.S. application Ser. No. 08/125,614 which is now U.S. Pat. No. 5,329,615, the teachings of which are incorporated herein by reference.

Context registers 42 store all of the cogenerator attributes. These attributes define the current state of the cogenerator 10. The current state may include a large number of parameters such as: cogenerator operational mode; draw pointer position; foreground color; background color; clipping window dimensions; etc. The contents of the cogenerator 10 are important as they define the personality of the cogenerator 10 at any given time and all attributes are user programmable. This gives a user considerable flexibility in operating the display system.

Also provided is a readback multiplexer 44 which is a large data multiplexer. It is used to multiplex data to the display memory interface unit 35 which is directed to either the display memory 26 or back to the host processor 14 via bus 18. Three sources of readback data are the context registers 42, the graphics generator 34 defined within the clashed block in FIG. 2, and the block texturing and complex clipping processor 30. If the data is intended for the host processor 14 it is sent through the FIFO buffer controller 38, 40 by the display memory interface unit 35. The graphics generator 34 is connected to the readback multiplexer 44 for various cogenerator 10 drawing operations. The block texturing and complex clipping processor 30 also sends data to the readback multiplexer 44 for various cogenerator 10 operations.

The graphics generator 34 generates all of the cogenerator primitives and symbols and performs bit block transfers (BITBLTs). The graphics generator 34 includes a multiprocess scheduler 46, a command generator 41, an area fill conic and vector generator 43, a symbol generator 45, and a BITBLT address generator 47. The area fill, conics and vector generator 43 creates digital signals representing graphics primitives such as polylines, rectangles, circles, ellipses and polygons and area fills. These primitive signals are next combined with other digital signals representing alphanumeric and other symbols, which are generated in the symbol and text generator 45 of the present invention, and with yet a third set of signals generated by block texturing and complex clipping processor 30 to produce the final set of signals which is then transferred by the BITBLT address generator 47 into specified pixel addresses in the bit mapped memory 22. Typically, the bit mapped memory 22 has multiple memory layers which set the color and intensity for the graphics display defined for each pixel location therein.

The multiprocess scheduler 46 controls data transfers between elements of the cogenerator 10. The multiprocess scheduler 46 uses a branched scheduler approach to control the several operations and apply certain characteristics of a software operating system thereto. This promotes functional independence between various cogenerator 10 sequences and provides a mechanism for inter-unit communication.

The area fill, conic and vector generator 43 calculates mathematical solutions for drawing geometric primitives. The symbol generator 45 generates alpha numeric symbols. The BITBLT address generator 47 provides a general purpose mechanism for moving rectangular blocks of image data in the bit map memory 22 and the display memory 26.

Detailed descriptions of the above-described devices are given in copending commonly assigned U.S. patent applications Ser. No. 07/582,728 entitled "Integrated Area Fill, Conics and Vector Generator in a Graphics Processor", now U.S. Pat. No. 5,303,321, Ser. No. 07/582,694 entitled "Hardware Bit Block Transfer Processor", now U.S. Pat. No. 5,218,674, and Ser. No. 07/582,695 entitled "Multiprocess Scheduler in a Graphics Processor,", now U.S. Pat. No. 5,265,203, the teachings of which are incorporated herein by reference.

Figure 3:
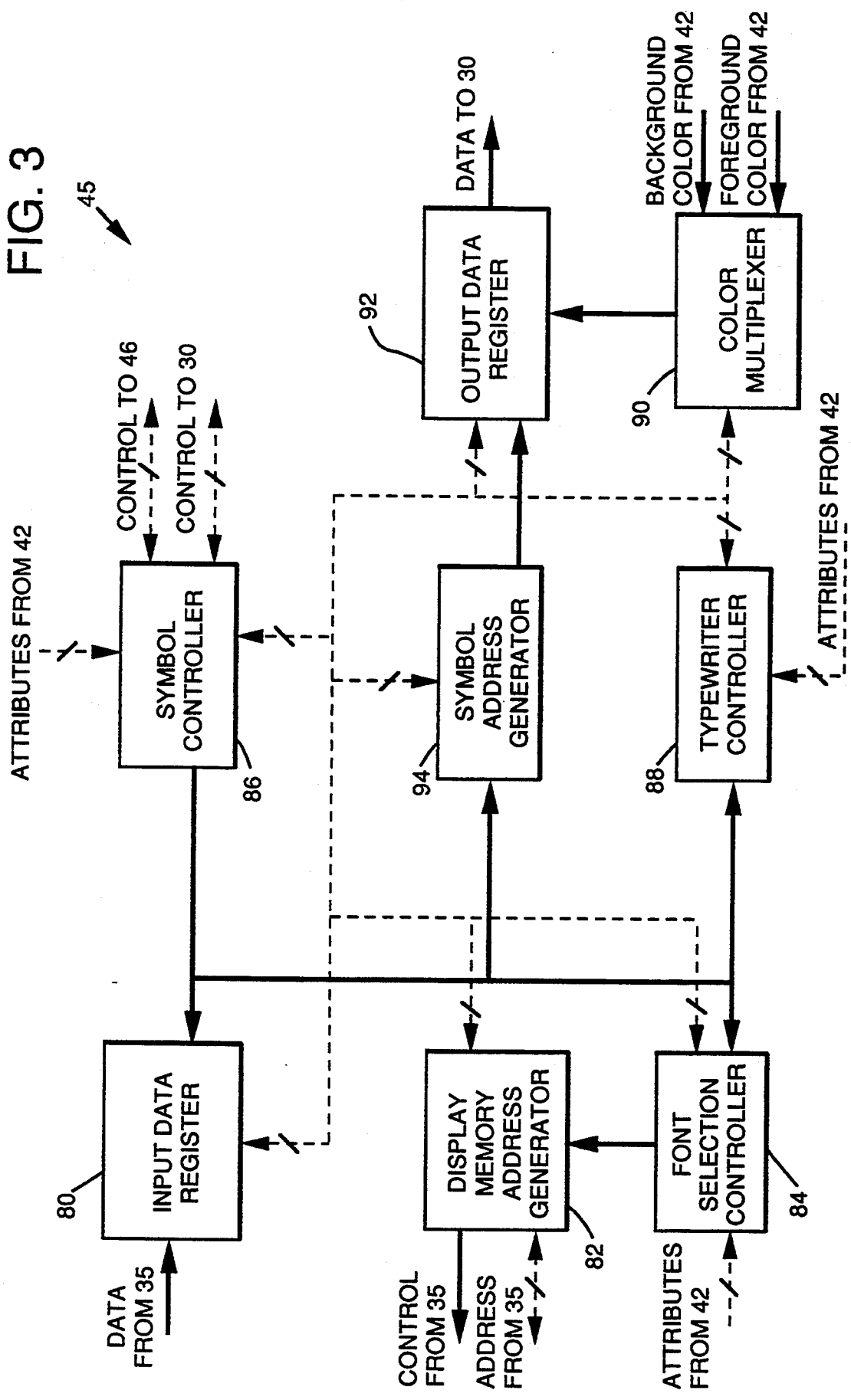
FIG. 3 is a detailed block diagram of the symbol and text generating processor of the present invention.

A detailed block diagram of the symbol and text generator 45 is shown in FIG. 3. The basic function of the symbol and text generator 45 is to accept symbol commands from the display memory interface unit 35 (FIG. 2) and generate the symbols and/or text characters. These are, referred to as simply symbols hereinafter. As the symbols are drawn they are sent to the texturing and complex clipper processor 42 as more fully described in copending United States patent application Ser. No. 07/582,696 referenced above. Initially, when the symbol generator starts to draw a symbol it accesses an appropriate font table in the cogenerator 10 display memory 26. The display memory 26 contains the necessary information to draw a desired symbol. The cogenerator 10 accesses display memory 26 through display memory interface unit 35. A general arrangement of the display memory 26 is shown in Table I.

Figure 4:
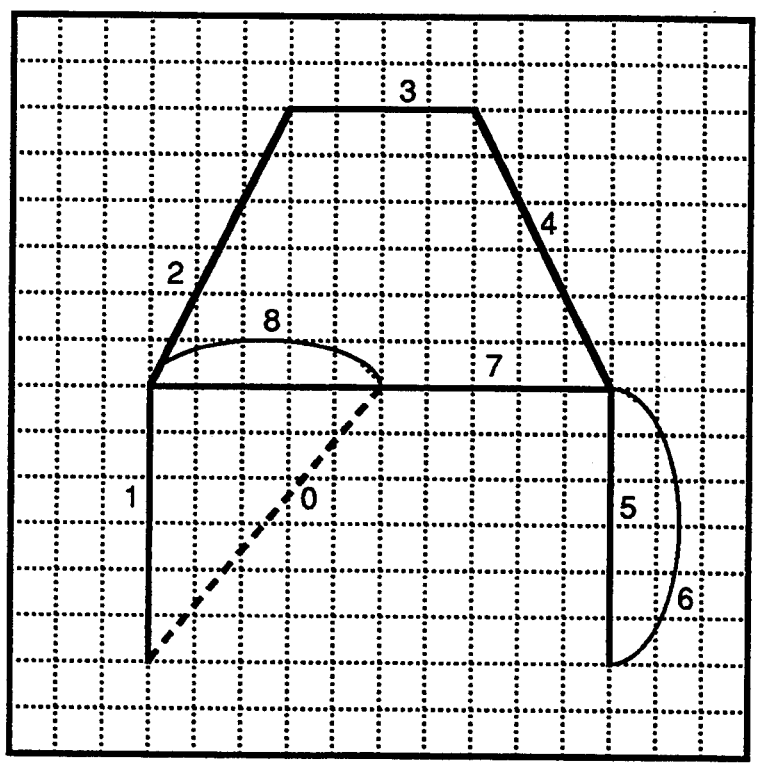
FIG. 4 is an illustration of a typical stroke coded symbol generated by the processor of the present invention.
Figure 5:
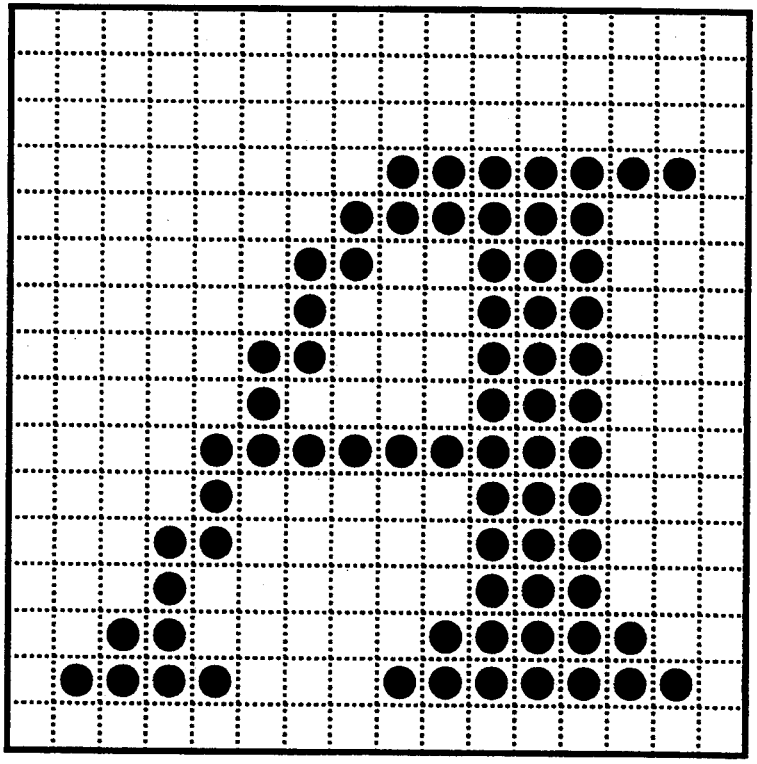
FIG. 5 is a diagram of a typical dot matrix symbol generated by the processor of the present invention.

The cogenerator 10 provides extensive symbol and text generation capability. It can render both stroke coded and dot matrix symbol. Stroke coded symbols are defined as a series of visible or blank strokes similar to a polyline. This unique sequence of strokes combined together to render this symbol properly. Dot matrix symbols are defined by a matrix, programmable in size, by drawing ones and drawing zeros. The drawing ones corresponds to pixels to be drawn while drawing zeros or pixels that remain unaltered in the drawing sequence. Dot matrix symbology provides improved visual appearance amounts for such enhancements as script, bold, candid and the like text and characters. A typical example of a stroke coded symbol is shown in FIG. 4. The symbol, the letter A, is constructed of nine strokes, with the strokes denominated 0 through 9. C denotes the symbol center and the strokes are drawn in sequential order zero through eight, while strokes 0, 6, 8 are blank. FIG. 5 shows a typical dot matrix rendering of the letter A. In FIG. 5, filled dots represents pixels which are to be drawn while blank squares are pixels that remain unchanged. The cogenerator 10 draws dot matrix symbols as a series of horizontal lines with a desired number of pixels turned ON or OFF.

Figure 6:
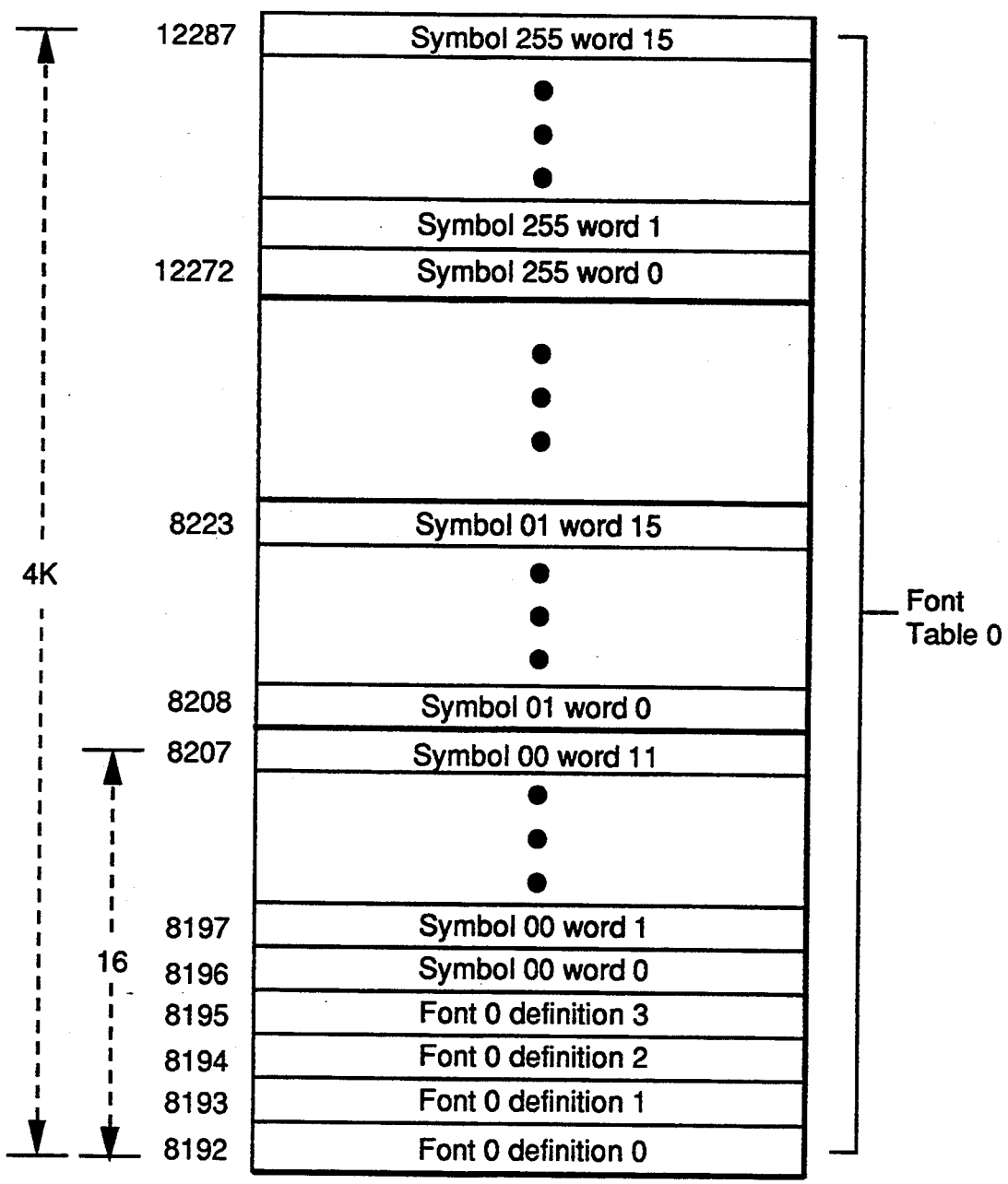
FIG. 6 is a diagram illustrating the arrangement of font tables within the display memory of the graphics rendering processor.

The cogenerator 10 draws symbols by drawing symbol data from the font tables (FIG. 6) located in display memory 26 and shown in Table I. A programmer causes the cogenerator 10 to draw different symbols by sending selected font and symbol code values to the cogenerator 10. Each font and symbol code maps to a unique symbol in the font table. The cogenerator 10 combines the font code with the symbol code to produce a unique address into the font table. The font table contains all of the data required by the cogenerator 10 to generate characters and symbols. Up to 128 user defined fonts may be put into the font table. Each font is allocated 4K by 32 address locations. A font may contain up to 256 characters and/or symbols. The typical font would have each symbol contained within 16 locations or less, This guarantees 256 symbols in each font table. Symbols may take more than 16 locations at a cost of a reduced number of symbols in that particular font. All symbols must start on 16 word boundaries, The arrangement of font tables is illustrated in FIG. 6. Each font has programmable parameters located in the first four locations of the font table. These parameters are used to characterize the font to the cogenerator 10 since there are many possibilities. The first symbol for a font starts at the fifth address location in the font. The starting address of all subsequent symbols in the font must start on boundaries starting every 16 locations. The first four addresses of the font table are used for purposes explained in more detail below.

Initially, the cogenerator 10 draws a symbol from a specific font by first reading in a definition of data words for the font number currently used. This transfer occurs only once for each font number change. The cogenerator 10 reads in a new font definition only if, as the cogenerator 10 is about to start a symbol draw, it compares the font number for the font number used for the previously drawn symbol and if they do not match the cogenerator 10 reads in new font definition words, or, the cogenerator 10 reads in font definition of words for the first symbol to be drawn following a cogenerator reset.

Each font is definable as either dot matrix or stroke coded. This definition tells the cogenerator 10 how to process assembled data in that particular font. The cogenerator 10 can further be programmed to underline symbols as they are drawn. Each font can be programmed separately for an underline thickness of 1 to 16 pixels. An underline offset is programmable from 0 to 127 pixels. The underline offset value defines the distance from the center of the symbol to the top of the underline. Underline placement is coupled to the current symbol rotation value as explained in more detail below.

Each font can be programmed in or out of what is called a typewriter mode. When the cogenerator 10 draws symbols from a font that is programmed from a typewriter mode, the cogenerator 10 acts as a typewriter. Each symbol that is received is drawn adjacent to the previous symbol in a line. The cogenerator 10 performs both carriage return and line feed functions in response to a carriage return and line feed code sent to the cogenerator 10. If the cogenerator 10 is not in a typewriter mode, carriage return and line feed codes is treated as normal symbol codes. Typically, this non-typewriter mode is for non-character files requiring a maximum number of symbols in the font. The carriage return and line feed codes are also programmable for each font. These codes are 8 bit codes just like symbol codes. The font can also be programmed for automatic line feed modes. This mode is valid only if the font is programmed for typewriter mode. If automatic line feed mode is enabled and the cogenerator 10 receives a carriage return code, the cogenerator 10 performs both a carriage return and a line feed function. If a line feed code is detected, it acts normally causing only a line feed operation.

Figure 7:
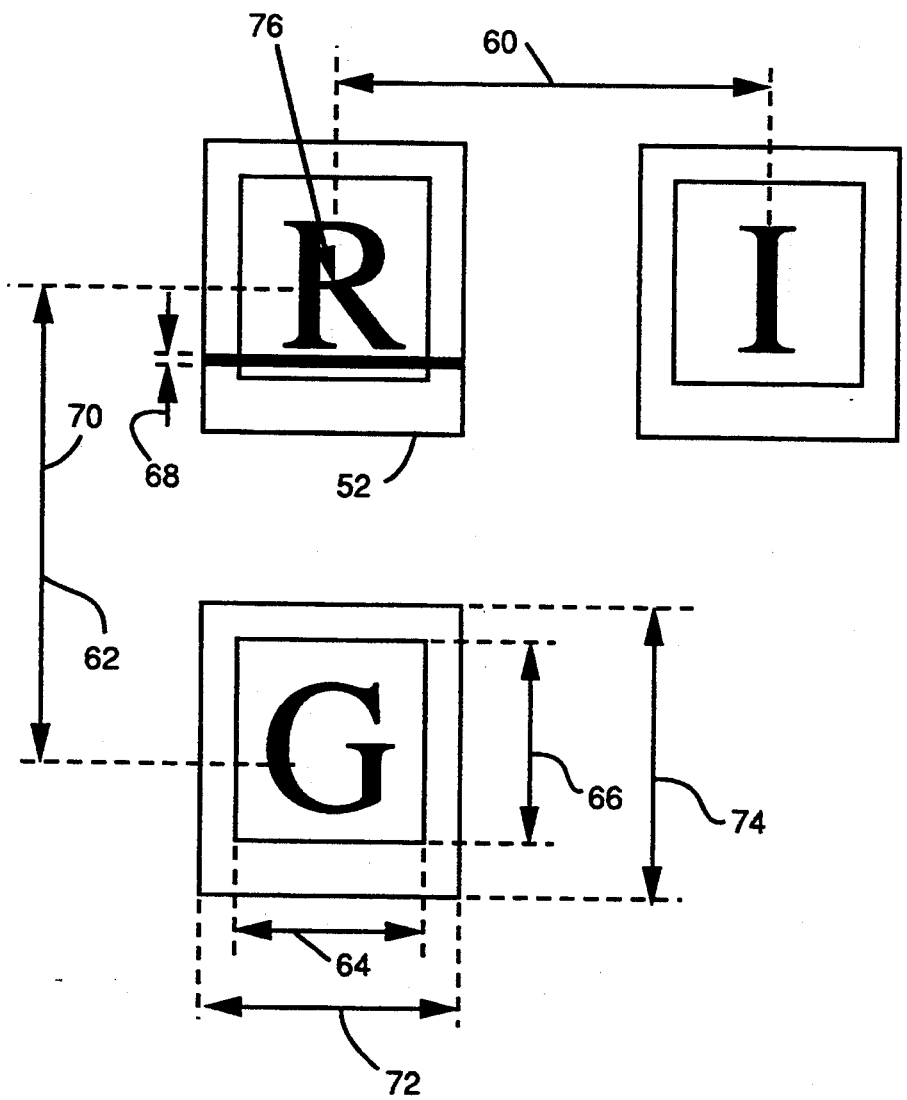
FIG. 7 is a diagram illustrating parameters used by the processor of the present invention for generating symbol and text symbols.

To support carriage return and line feed operation, each font has an X and Y spacing parameter or value 60, 62, respectively. These are illustrated in FIG. 7 along with other parameters such as X and Y site 64, 66, underline offset 68 and underline thickness 70. These values are used by the cogenerator 10 to determine spacing between symbols and lines of symbols between typewriter mode operations. The X spacing value 60 can range from 0 to 255 pixels. The Y spacing value 62 ranges from 0 to 255 pixels. The cogenerator 10 stores a carriage return reference point. This is defined as the last user defined draw pointer position. The cogenerator 10 uses this reference to determine where to position for the next symbol following a carriage return.

Each font has a symbol size parameter. The size of the symbol is defined by two fields. The fields are the X size 64 and Y size 66. The X size 66 specifies the symbol size in the X direction up to 256 pixels and the Y size 68 specifies the symbol size from the Y direction up to 256 pixels.

Each font further has a symbol cell size parameters 72, 74. The symbol cell is a user defined rectangular region centered on the symbol and typically larger than the symbol. It is used as the background region of the symbol. The cogenerator 10 has the ability to draw two color symbols. The two color symbols appear as a specific color with a filled rectangular background. The size of a symbol cell 52 is defined by two fields. The X size 22 specifies the cell size in the X direction up to 256 pixels and the Y size 74 specifies the cell size in the Y direction up to 256 pixels.

For dot matrix fonts the field which specifies word count must be defined. This field defines a number of 16 bit data words required for each dot matrix symbol. Each display memory 26 location stores the symbol data just as it will appear on the screen as a horizontal raster line (all pixels at the same Y address). The number of locations required is simply given by the equation X size/32 rounded up to the next highest integer. The display memory 26 storage cells are 32 bits wide providing two words at each display memory location. For dot matrix symbols wider than 32 bits, more display memory 26 locations are required to store each horizontal raster line making up the dot matrix symbol. The cogenerator 10 uses this information when drawing dot matrix symbols to determine when to finish the symbol. The word count is computed as exercise/16 rounded up x (Y size). For example, for a 16 by 16 dot matrix symbol, the word count is 16 and for a 40 by 32 dot matrix symbol, the word count would be 96.

The programmer can exercise many options when drawing symbols. Symbol data can be sent to the cogenerator 10 in one of three ways. The programmer can send a symbol code, a font code, an attributes in one 32 bit a word. Another option is to send two symbol codes for each symbol with corresponding attributes in one 32 bit data word. These symbols would be drawn from the same font table. A third mode allows the user to send 4 characters and one 32 bit data word. In this situation, all four symbols would be drawn from the same font table and have identical attributes.

The cogenerator 10 provides numerous symbol attributes and modes of operation. The following describes symbol attributes stored in registers within the cogenerator 10 and used by the cogenerator 10 when it is drawing the symbols.

An internal font register (not shown in the drawings) is provided to the programmer. The cogenerator 10 uses the contents of this register to select one of the 128 font tables when it draws a symbol. The user may override this value on a symbol by symbol basis. The cogenerator 10 supports a mode where the font select code may be set with each symbol. This allows a programmer to draw symbols from many different fonts without constantly reloading the font register. If this mode is utilized, the font register remains unchanged. The cogenerator 10 receives a font select code with the symbol code. An automatic symbol spacing function is provided. If automatic symbol spacing is enabled, the cogenerator 10 automatically positions the draw pointer for the next symbol. This feature is normally used during typewriter mode. The new position of the draw pointer is determined by adding or subtracting either the X or Y symbol space values 60, 62 from the previous draw pointer position. A decision to add or subtract and whether to use the X or Y symbol space values based on the current typewriter direction, that is, right, left, up, or down. This feature allows a programmer to code stroke symbols with a symbol spacing value already included using blank strokes. This would allow the cogenerator 10 to render character strings with proportional spacing. Each character can be coded with a unique space value and provide proportional spacing when the characters are combined and drawn in a string.

The cogenerator 10 supports four typewriter direction modes. This parameter specifies the direction consecutive symbols will be drawn by the cogenerator 10. The normal typewriter direction for symbols is the positive X direction which traverses from left to right across the display surface. The cogenerator 10 spaces each symbol by adding the X spacing value 60 for the font being drawn to the previous display or draw pointer value. This is known as a symbol spacing value. In this mode, a carriage return causes the cogenerator 10 to position the draw pointer back to the carriage return reference position. This movement is from right to left just like a typewriter. A line feed signal causes the cogenerator 10 to position the draw pointer in the positive Y direction which is top to bottom on the display surface. The line feed causes a repositioning of the draw pointer by adding the Y spacing value for the font being drawn to the previous draw pointer position. This is known as the line space value.

A second typewriter direction is the negative X direction which traverses from right to left across the display surface. The cogenerator 10 spaces each symbol by subtracting the X spacing value from the previous draw pointer value. In this mode a carriage return causes the cogenerator 10 to position the draw pointer back to the carriage reference position. This movement is from left to right, a line feed causes the cogenerator 10 to position the draw pointer in the negative Y direction which is bottom to top on the display surface. The line feed signal causes a repositioning of the draw pointer by subtracting the Y spacing value from the previous draw pointer position.

A third typewriter direction for symbols is the positive Y which traverses from top to bottom across the display surface. The cogenerator 10 spaces each symbol by adding the Y spacing value to the previous draw pointing value. In this mode, a carriage return causes the cogenerator 10 to position the draw pointer in the negative X direction which is right to left on the display surface. The line feeds signal causes a repositioning of the draw pointer by subtracting the X spacing value from the previous draw pointing position.

The fourth typewriter direction is the negative Y direction which traverses from bottom to top across the display surface. The cogenerator 10 spaces each symbol by subtracting the Y spacing value form the previous draw pointer value. In this mode, a carriage return causes the cogenerator 10 to position the draw pointer back to the carriage return reference position. This movement is from top to bottom. A line feed signal causes the cogenerator 10 to position the draw pointer in the positive X direction which is left to fight on the display surface. The line feed causes a repositioning of the draw pointer by adding the X spacing value to the previous draw pointer position.

The cogenerator 10 also provides automatic pointer centering for symbols. When this mode is enabled, the cogenerator 10 reloads the draw pointer position after the symbol is completed. The value that is loaded is simply the draw pointer value before the symbol was drawn, that is, the center of the symbol 76. Pointer centering is performed before symbol spacing is performed. For dot matrix symbols this feature should be enabled. This is because the draw pointer finishes at the lower right hand corner position when dot matrix symbols are drawn. Therefore automatic pointer centering should be used to reposition the draw pointer back to the center of the symbol to allow for a string of symbols to be drawn parallel to either the X or Y axis depending on the current typewriter direction. For stroke coded symbols automatic pointer centering is optional. Stroke coded symbols can be defined to return to the center of the symbol with blank strokes.

The cogenerator 10 performs hardware symbol rotation. The programmer can choose from four different rotate angles. The possible rotate angles are 0, 90, 180 and 270 degrees. The normal rotate angle value is 0 degrees. In this mode the symbol is drawn in the standard orientation. For example, the letter "E" would face to the right in the positive X direction. If the rotate angle is set at 90 degrees, the character "E" would face up in the negative Y direction. The rotate angle is set at 180 degrees, the character "E" would face to the left in the negative X direction and be upside down. If the rotate angle is set at 270 degrees;, the character "E" would face down in the positive Y direction. The cogenerator 10 also rotates the background cell and underline to match the symbol underline or two color attributes are enabled for that symbol. Symbol rotation only applies to stroke coded symbols. Dot matrix symbols are not rotatable.

The cogenerator 10 performs hardware symbol scaling. The programmer can choose from different scale factors. The possible scale factors are 1X, 2X, 4X, 8X, 16X, 32X and 64X. Symbol scaling applies to stroke coded symbols only. Dot matrix symbols are not scalable. The background cell and underline (if enabled) is scaled based on the selected scale factor as well. The cogenerator 10 scales the symbol by the detected amount uniformly in both the X and Y direction about the center of the symbol.

The cogenerator 10 provides a large number of fonts to allow the programmer to code symbols at nonbinary values with the internally provided rotate angles and scale factors to provide even more possibilities. The font table works in harmony with the internal scale and rotate functions of the cogenerator 10. The scales are multiplicative and the rotates are additive. An example is: If the internal rotation is ROT=90 degrees, internal SCALE=8X, and the font is coded at a scale of 3.6 and rotation of 36.3 degrees then the cogenerator 10 draws the symbol into bitmap at a scale of 28.8X and rotation angle of 126.3 degrees.

The cogenerator 10 provides an underline enable register which is user programmable. If enabled, the cogenerator 10 underlines each symbol. The underline definition described earlier defines the width and location relative to the center of the symbol (offset). The length of the underline is always set equal to the X cell size 72 value and is affected by the current scale factor. This insures that the underline traverses the entire width of the background when the background region is filled during two color symbol mode. The orientation of the underline is affected by the current rotate angle. The color of the underline is the same as the symbol which is the current foreground color value stored in the cogenerator 10 unless inverse video symbols are enabled. The cogenerator 10 supports a mode where the programmer may enable or disable underlining on a symbol by symbol basis. The cogenerator 10 accepts symbol data that includes an underline enable bit. If the underline bit is enabled, the cogenerator 10 underlines that particular symbol overriding the contents of the underline register. The underline register remains unaltered by this mode of operation.

The cogenerator 10 provides a two color symbol enable register which is user programmable. If enabled, the cogenerator 10 draws two color symbols. A two color symbol appears as a symbol drawn in the foreground color with a filled rectangular cell (symbol cell) drawn in the background color. The cogenerator 10 first fills the background region centered around the draw pointer. The size is defined by the current font definition and the current scale factor. The orientation of the background cell is affected by the current rotate angle. Once the background fill is complete, the cogenerator 10 then draws the symbol over the background thus completing the two color symbol. The cogenerator 10 supports a mode where the programmer may enable/disable two color symbols on a symbol by symbol basis. The cogenerator 10 accepts symbol data that includes a two color symbol enable bit. If the two color bit is enabled, the cogenerator 10 draws that particular symbol as a two color symbol.

The cogenerator 10 provides an inverse video symbol enable control which is user programmable. If enabled, the cogenerator 10 reverses the foreground for the background color when drawing symbols. If two color mode is disabled, then the symbols is drawn in the background color instead of the foreground color. If two color symbols are enabled, then the symbol cell is drawn in the foreground color and the symbol is drawn in the background color. The cogenerator 10 supports a mode where the programmer may enable/disable inverse video symbols on a symbol by symbol basis. The cogenerator 10 accepts symbol data that includes an inverse video enable bit. If the inverse video overrides the contents of the inverse video register, the inverse video register remains unaltered by this mode of operation.

Referring again to FIG. 3 the symbol generator's input data register 80 is used to store all incoming data from the display memory interface unit 35. This data includes symbol commands, symbol generator programming data, symbol data fetched from display memory 26 and font table definition attributes. This register 80 temporarily holds this information until it is routed to the proper part of the symbol generator 45.

The display memory address generator 82 is used by the symbol generator 45 to address the display memory 26. The symbol generator 45 performs read cycles from the font tables in display memory 26 when drawing symbology. The display memory address generator 82 contains an address counter. The address is formed from the current font value and a symbol entry counter. The font value is input to the display memory address generator 82 from a font selection controller 84. As mentioned earlier when the symbol generator 45 is told to draw a symbol from a new font table, it reads in new font table definition attributes. The display memory address generator 82 is used to address these values as they are read into the symbol generator 45. The symbol entry counter is simply the current position that the symbol generator 45 is at when drawing a symbol. The symbol generator 45 performs multiple reads from display memory 26 when drawing a symbol. When a symbol is drawn the symbol generator 45 addresses the symbol data starting at the first location of that symbol and sequentially read in symbol data until the symbol is completed. The symbol entry counter is incremented for each symbol data value read.

The font selection controller 84 contains registers and comparators. It's main function is to store the current font table and send it to the display memory address generator 82. Also it must compare any new font table that is sent to the symbol generator 45. If the new font table code differs from the current code the font selection controller 84 informs a symbol controller. This way the new font definition may be read into the symbol generator 45 before symbols can be drawn from the new font table. The font selection controller 84 receives attributes from the context registers 42 which provides font table information.

The typewriter controller 88 contains logic to control the cogenerator 10 typewriter functions. The context registers 42 store the cogenerator 10 attributes and send the typewriter information to the typewriter controller 88. This information includes such things as the current typewrite mode, the carriage return code, line feed code, auto line feed code, typewriter direction, auto symbol spacing etc. The typewriter controller 88 monitors incoming symbol data when each new symbol is to be drawn. If a carriage return or a line feed code is detected, it informs the symbol controller 86. It tells the symbol controller 86 what the typewriter direction is. When a symbol is completed it tells the symbol controller 86 what symbol spacing to use for the next symbol. The typewriter controller 88 helps the symbol controller 86 position the symbols properly to provide all the typewriter features mentioned earlier.

A color multiplexer 90 receives background and foreground color information from the context registers 42. The color multiplexer 90 is controlled by the symbol controller. The output of the color multiplexer 90 is sent to a bit map memory output data register 92. This value is used as the color value for the symbol when it is drawn. As mentioned earlier the cogenerator 10 can draw two color symbols. The color multiplexer 90 allows the symbol controller 86 to select either background or foreground color depending upon whether a symbol is being drawn or a background cell is being drawn. Also when inverse video symbols are drawn and foreground and background colors are reversed by the symbol controller using the color multiplexer 90.

The symbol address generator 94 is where the symbols are actually rendered. The symbol address generator 94 draws both dot matrix symbols and stroke coded symbols depending on what is required. The symbol address generator 94 contains registers, counters, comparators and controllers. It is controlled by the symbol controller 86. The symbol controller 86 tells the symbol address generator 94 when to draw symbols and background cells and when to space symbols, perform a carriage return and/or a line feed. The symbol address generator 94 provides feedback to the symbol controller 86 about its current state. The symbol address generator 94 is told what the typewriter direction is by the typewriter controller 88. The symbol address generator 94 also performs the scaling and rotation of the symbols if this is required.

The symbol controller 86 is the main controller of the symbol generator 45. It must insure that all the functions of the symbol and text generator 45 work in harmony to produce symbols. It optimizes the performance of the symbol and text generator 45 by keeping all the pipeline stages full and all the functions actively performing tasks. It loads the input data register 80. It controls the display memory address generator 82. It controls the symbol address generator 94 and color multiplexer 90. It loads the display memory output register 92. It must handshake with both the multiprocess scheduler 34 and the texturing/clipper processor 30. It monitors status from all the functions in the symbol address generator 94. It also has inputs from the context registers 42 which are symbol attributes defining many function that need to be performed in line with the current cogenerator 10 state.

The display memory output register 92 is the final pipeline stage of the symbol generator 45. As symbols are drawn, the display memory output register 92 is loaded by the symbol controller 86. It :stoves pixel address and color information which is sent to the texturing/clipper processor 30. Eventually this information is sent over the image bus 20 by the cogenerator 10 and drawn into bit mapped memory 22. From there it is displayed on video display 24 as symbols and/or characters with all the features described earlier.

Thus there has been described a new and improved hardware symbology and text generator capable of multiple hardware based rendering functions. It is to be understood that the above-described embodiment is merely illustrative of some of the many specific embodiments which represent applications of the principles of the present invention. Clearly, numerous and other arrangements can be readily devised by those skilled in the an without departing from the scope of the invention.

What is claimed is:

1. A symbol and text generator for use in a graphics processor having a context register for storing present operating attributes of said graphics processor and a display memory for storing font data, symbol data, and symbol generating commands, said symbol and text generator comprising:

a symbol input data register for temporarily storing said font and symbol data and said symbol generating commands received from said display memory and said operating attributes received from said context register;

a display memory address generator for addressing said symbol and font data and said symbol generating commands stored in said display memory;

a font selection controller for receiving and storing a default font table code from said context register, monitoring said symbol generating commands, comparing said default font table code with a font selected by said symbol generating commands, sending said default font table code to said display memory address generator if said selected font is the same as said default font or if no new font is selected by said symbol generating commands, and sending a code that corresponds to said selected font to said display memory address generator if said selected font is different than said default font;

a symbol address generator for generating address signals which describe where said symbols and/or text are to be drawn on a disposal screen in response to said symbol and font data;

a symbol controller for controlling the operation of said display memory address generator and said symbol address generator; and a symbol output data register for receiving and storing said address signals from said symbol address generator;

said symbol generating commands being stored in said display memory and said input data register in a selectable one of the following symbol generating command formats:

a symbol code, a font code and symbol attributes;

two symbol codes and two sets of symbol attributes; and four symbol codes;

said symbol controller and said symbol address generator processing a selected symbol and font data packing format.

2. The generator of claim 1 further comprising a typewriter controller for controlling the spacing and writing direction of said symbols and text.

3. The generator of claim 2 wherein said typewriter controller is adapted to generate carriage return and line feed control signals.

4. The generator of claim 3 wherein said typewriter controller is adapted to generate separate automatic carriage return and line feed signals, and combined automatic carriage return and line feed signals.

5. The generator of claim 3 wherein said typewriter controller is adapted to store carriage return reference position data.

6. The generator of claim 2 wherein said typewriter controller is adapted to rotate the display orientation of said symbols and text.

7. The generator of claim 2 wherein said typewriter controller is adapted to generate a series of said symbols and/or text in a plurality of rotated lineal directions.

8. The generator of claim 7 wherein said typewriter controller is adapted to generate lines of symbols and/or text in four typing directions including left to right, right to left, top to bottom and bottom to top.

9. The generator of claim 2 wherein said typewriter controller is adapted to automatically space said symbols and/or text in accordance with symbol spacing data contained in an active font table.

10. The generator of claim 9 wherein said active font table comprises programmable X and Y spacing values that are adapted to provide symbol and text spacing and line feed actions.

11. The generator of claim 9 wherein said typewriter controller is adapted to selectively enable and disable said automatic symbol spacing.

12. The generator of claim 1 further comprising a color multiplexer for enclosing said symbols and text in a background field.

13. The generator of claim 12 wherein said color multiplexer is adapted to generate said background field in a different color than the color of said symbols and text.

14. The generator of claim 13 wherein said color multiplexer is adapted to reverse the colors of one or more of said symbols and/or text and said background field.

15. The generator of claim 12 wherein said color multiplexer is adapted to generate one or more of said symbols and/or text in a foreground color and a symbol cell in a background color with said foreground and background color selectable on a symbol by symbol basis.

* * * * *